Patented Aug. 8, 1950

2,518,295

UNITED STATES PATENT OFFICE 2,518,295

PRODUCTION OF NITRILES

William I. Denton and Charles J. Plank, Woodbury, N. J., assignors to Socony-Vacuum Oil Company, Incorporated, a corporation of New York No Drawing. Application September 22, 1948, Serial No. 50,667

11 Claims. (Cl. 260—465)

This invention relates, broadly, to the production of nitriles, and is more particularly concerned with metal oxide-promoted catalysts for the production of nitriles containing at least two carbon atoms per molecule.

Nitriles are organic compounds containing combined nitrogen. Their formula may be represented thus: $R—C\equiv N$, wherein R is an alkyl or an aryl radical. These compounds are extremely useful, since they can be converted readily into many valuable products such as acids, esters, amines, aldehydes, etc.

In copending applications, of which Serial Number 641,640, filed January 16, 1946 now Patent No. 2,450,632; Serial Number 645,012, filed February 1, 1946 now Patent No. 2,450,637; and Serial Number 645,013, filed February 1, 1946 now Patent No. 2,450,638 are typical, catalytic processes have been disclosed for the production of nitriles containing at least two carbon atoms per molecule. Briefly, in accordance with these processes, a hydrocarbon containing at least two carbon atoms per molecule and having at least one carbon atom to which at least two hydrogen atoms are attached is reacted with ammonia, in the gaseous phase and at elevated temperatures, in the presence of catalytic material containing a molybdenum oxide.

As is well known to those familiar with the art, in certain catalytic processes, the activity of the catalyst is greatly enhanced when small amounts of substances known as promoters are incorporated therewith. Promoters are substances which may, or may not, have any catalytic activity in themselves, but which greatly increase the activity of the catalyst with concomitant increased yields of the desired products of the process in which the catalyst is employed. Substances which are utilizable as promoters are numerous and varied, and, as is well known in the art, it is virtually impossible to predict before hand the results obtainable from the combination of a given catalyst with a given promoter or class of promoters. For example, in the dehydration of alcohol with an alumina catalyst, copper oxides retard the activity of the catalyst. On the other hand, in the hydrogenation of cotton-seed oil, in the presence of nickel monoxide (NiO) catalyst, copper oxides greatly enhance the activity of the catalyst.

It has now been found that it is possible to obtain higher conversions of nitriles containing at least two carbon atoms per molecule through the catalyzed reactions set forth in the applications enumerated hereinbefore. It has been discovered that higher conversions of nitriles containing at least two carbon atoms per molecule are obtained when conducting the aforementioned processes in the presence of catalysts promoted by relatively small amounts of oxides of certain metals.

Accordingly, it is an object of the present invention to provide an improved process for the production of nitriles containing at least two carbon atoms per molecule, which is relatively simple and inexpensive. An important object is to provide improved catalysts for use in the production of nitriles containing at least two carbon atoms per molecule, by the reaction of hydrocarbons containing at least two carbon atoms per molecule and at least one carbon atom to which at least two hydrogen atoms are attached, with ammonia, at elevated temperatures. A specific object is to provide an improved catalyst for use in the production of nitriles containing at least two carbon atoms, which comprises a molybdenum oxide and small amounts of oxides of certain metals. Other objects and advantages of the present invention will become apparent to those skilled in the art from the following description.

Broadly stated, the present invention provides an improved process for the production of nitriles containing at least two carbon atoms per molecule, which comprises contacting a hydrocarbon containing at least two carbon atoms per molecule and at least one carbon atom to which at least two hydrogen atoms are attached, with ammonia, in a reaction zone, in the gaseous phase, at a temperature falling within the range varying between about 850° F. and about 1250° F., and in the presence of a catalyst containing molybdenum oxides and an oxide of a metal selected from the group consisting of copper, silver, gold, beryllium, magnesium, zinc, cadmium, mercury, silicon, titanium, germanium, zirconium, tin, cerium, hafnium, lead, thorium, tungsten, uranium, and manganese.

In general, any hydrocarbon containing at least two carbon atoms per molecule and having at least one carbon atom to which at least two hydrogen atoms are attached is suitable as the hydrocarbon reactant in the process of the present invention. For example, any hydrocarbon containing at least two carbon atoms and at least one methylene group (—$CH_2$—) or one methyl group (—$CH_3$) will produce nitriles in accordance with the present invention. Depending on the particular nitrile product desired, the hydrocarbon reactant may be a paraffinic hydrocarbon, an olefinic hydrocarbon, or an alkyl- or alkenyl-substituted aromatic hydrocarbon.

Any paraffinic hydrocarbon, aliphatic or alicyclic, having at least two carbon atoms per molecule is utilizable as the hydrocarbon reactant in the process of the present invention. Ethane, propane, butane, isobutane, pentane, hexane, cyclohexane, methyl hexane, methyl cyclohexane, dimethyl pentane, heptane, octane, nonane, trimethyl pentane, tetramethyl pentane, and decane may be mentioned by way of non-limiting examples of suitable paraffinic hydrocarbon reactants.

With respect to olefinic hydrocarbons, any olefinic hydrocarbon, aliphatic or alicyclic, having at least one olefin group (C=C) is utilizable as the hydrocarbon reactant. Non-limiting examples of suitable olefinic hydrocarbon reactants are ethylene, propylene, butenes, cyclohexene, octenes, methyl heptenes, decenes, butadienes, pentadienes, ethyl butenes, hexadienes, heptenes, pentenes, etc.

It will be clear from the discussion of the reaction temperature set forth hereinafter that many paraffinic and olefinic hydrocarbons, when in contact with ammonia and a catalyst of the type described herein, are not present per se in the reaction zone, since many of these hydrocarbons are cracked to related hydrocarbons under such conditions. Nevertheless, all paraffinic hydrocarbons having at least two carbon atoms per molecule and all olefinic hydrocarbons, and their hydrocarbon decomposition products which are in the gaseous phase under the reaction conditions defined hereinafter, serve the purpose of this invention. It is to be understood also that any hydrocarbon mixture containing one or more paraffinic hydrocarbons having at least two carbon atoms per molecule or one or more olefinic hydrocarbons may be utilized herein, and that when such mixtures are used, the reaction conditions, such as contact time, will be slightly different in view of the dilution effect of the constituents present with the paraffinic and/or olefinic hydrocarbon, or hydrocarbons. Accordingly, paraffinic hydrocarbons having at least two carbon atoms per molecule, olefinic hydrocarbons, mixtures thereof, and hydrocarbon mixtures containing one or more of such paraffinic and/or olefinic hydrocarbons may be employed. Although any paraffinic hydrocarbon having at least two carbon atoms per molecule and/or any olefinic hydrocarbon having at least one olefin group may be used in the present process, it is preferred to use those containing up to about ten carbon atoms per molecule, and of these, ethylene, propane, propylene, butanes, butadiene, and heptanes are especially preferred.

The hydrocarbon reactants utilizable for preparing primarily aromatic nitriles, mononitriles and polynitriles, in accordance with the present invention, are the alkyl- and/or alkenyl-substituted aromatic hydrocarbons. Due to their availability, the methyl-substituted aromatic hydrocarbons are used ordinarily. Especially preferred aromatic hydrocarbon reactants are the alkyl- and/or alkenyl-substituted benzenes. Non-limiting examples of the aromatic hydrocarbon reactant are toluene, xylene, trimethylbenzenes, styrene, methyl naphthalene, and dimethyl naphthalenes. As is well known to those familiar with the art, the alkyl- and/or alkenyl-substituted aromatic hydrocarbons utilizable herein may be derived from any suitable source. It is to be understood, however, that hydrocarbon fractions containing alkyl- and/or alkenyl-substituted benzenes and that other alkyl- and/or alkenyl-substituted aromatic hydrocarbons, such as the thus substituted naphthalenes, and fractions containing the same may be employed.

The ratio of ammonia to the hydrocarbon reactant may vary over a wide range with little effect on the conversion per pass and ultimate yield. In general, the reaction mixture may contain as little as 2 mole per cent or as much as 98 mole per cent of hydrocarbon reactant. Ordinarily, however, it is preferred to use charges containing between about 20 mole per cent and about 90 mole per cent of hydrocarbon. In practice, it is usually preferable, to use charges containing a molar excess of ammonia over the hydrocarbon reactant.

In accordance with the present invention, the catalysts operative to produce nitriles containing at least two carbon atoms per molecule by reacting hydrocarbons containing at least two carbon atoms per molecule and having at least one carbon atom to which at least two hydrogen atoms are attached, with ammonia, are those containing a molybdenum oxide, such as molybdenum sesquioxide ($Mo_2O_3$), molybdenum dioxide ($MoO_2$)$_3$, molybdenum trioxide ($MoO_3$), and molybdenum pentoxide ($Mo_2O_5$). In the interest of brevity, it must be clearly understood that when reference is made to molybdenum oxide, herein and in the claims, the various oxides of molybdenum will be contemplated. While all of these metal oxides are operative as catalysts in the process of the present invention, they are not equivalent in their effectiveness from the standpoint of catalytic activity. Preferred catalysts are those containing molybdenum trioxide.

While these metal oxide catalysts exhibit different degrees of effectiveness when used per se, they generally possess additional catalytic activity when used in conjunction with the well known catalyst supports, such as alumina, silica gel, silica-alumina, magnesia, carborundum, pumice, clays, and the like. It is especially preferred to use activated alumina or alumina gel as a support, and a catalyst comprising molybdenum trioxide supported on activated alumina or alumina gel has been found to be particularly useful.

The concentration of catalytic metal oxide, i. e., molybdenum oxide, in the supported catalysts is not too critical a factor. In general, amounts up to about 30 per cent by weight are suitable. In practice, it is preferred to use about ten per cent by weight of the catalytic metal oxide.

In accordance with the present invention, the catalyst, preferably, a molybdenum oxide on a catalyst support, is promoted by small amounts of compounds of certain metals. In general and as stated hereinbefore, these compounds are the oxides of copper, silver, gold, beryllium, magnesium, zinc, cadmium, mercury, silicon, titanium, germanium, zirconium, tin, cerium, hafnium, lead, thorium, tungsten, uranium, and manganese. The oxides which have been found to be most effective as promoters are the oxides of copper, silver, beryllium, manganese, zinc, thorium, silicon, lead, tungsten, magnesium and cerium. Of these, the oxides of copper, beryllium, and tungsten are especially preferred.

The promoting compounds may be incorporated in the catalyst in amounts from about 0.5 and up to about twenty per cent, by weight, of the catalyst. In practice, however, amounts varying between about 0.5 per cent and about 5 per cent, by weight, are preferred. Accordingly, the preferred catalysts of the present invention comprise up to about 30 per cent, by weight, of a molybdenum oxide, and, preferably, about 10 per cent; between and 0.5 per cent and about 5 per cent, by weight, of one of the aforementioned metal oxide promoters; and the balance, a catalyst support.

In general, the catalysts contemplated herein are prepared by a process involving two steps, namely, (1) preparation of the supported molybdenum oxide catalysts, and (2) impregnation of the catalyst with the promoter. The supported molybdenum oxide catalyst may be prepared by any of the methods known to those skilled in the art. For example, the catalyst support may be impregnated with a decomposable salt of molybdenum and ignited to obtain the corresponding catalytic oxide. In another method, the catalyst support, such as alumina, and the molybdenum oxide may be coprecipitated from a solution of soluble salts of the metals, followed by ignition to obtain the catalytic metal oxide. The supported catalyst thus prepared is impregnated with the promoter by dissolving in water the desired amount of a decomposable salt which will afford the metal oxide promoter, adding the supported catalyst to the solution, and evaporating the aqueous solution to substantial dryness. The resulting mixture is heated at elevated temperatures to convert the decomposable salt to the oxide. Non-limiting examples of decomposable salts which afford the metal oxide promoter utilizable herein, are copper acetate, copper bromide, copper sulfate, copper carbonate, silver acetate, silver nitrate, beryllium acetate, beryllium nitrate, magnesium acetate, magnesium bromide, magnesium chloride, magnesium sulfate, zinc bromide, zinc sulfate, zinc nitrate, thorium nitrate, lead acetate, tungsten sulfide, manganese acetate, manganese bromide, manganese sulfate, cerium acetate, and cerium bromide.

It is to be strictly understood, however, that the promoted, supported catalysts of the present invention may be prepared by other standard methods of catalyst preparation. For example, they may be prepared by coprecipitation of metal oxide catalyst, metal oxide promoter, and catalyst support by gelation, and the like.

In order to obtain initial maximum catalyst efficiency, particularly where the catalytic material comprises the higher oxides of the catalytic metal, the catalysts should be conditioned prior to use in the process. Conditioned catalysts are those which have been exposed to ammonia or hydrogen, or both, for a period of time, several minutes to several hours, depending upon the quantity, at temperatures varying between about 800° F. and about 1250° F. If desired, however, the conditioning operation may be dispensed with, inasmuch as the catalyst becomes conditioned during the initial stages of the process, when the catalyst comes in contact with the ammonia reactant.

In operation, the catalysts become fouled with carbonaceous material which ultimately affects the activity of the catalyst. Accordingly, when the efficiency of the catalyst declines to a point where further operation becomes uneconomical, or disadvantageous, from a practical standpoint, the catalyst may be regenerated, as is well known in the art, by subjecting the catalyst to a careful oxidation treatment, for example, by passing a stream of air, or air diluted with flue gases, over the same under appropriate temperature conditions and for a suitable period of time, such as a period of time equivalent to the duration of the catalytic operation. Preferably, the oxidation treatment is followed by a purging treatment, such as passing a stream of purge gas over the catalyst, for example, nitrogen, carbon dioxide, hydrocarbon gases, etc.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. It is preferred, however, to use contact times varying between about 0.1 second and one minute, particularly, between 0.3 second and 30 seconds. It must be realized that, at best, these figures are estimates based on a number of assumptions. For all practical purposes, as in catalytic processes of the type of the present invention, the more reliable data on contact time is best expressed, where feasible and as is well known in the art, in terms of liquid space velocities, i. e., in the present instance, the volume of liquid hydrocarbon reactant per volume of catalyst per hour. Accordingly, it has been found that the space velocities may be varied considerably, and that velocities varying between about one-fourth and about four are quite satisfactory for the purposes of the present invention, when atmospheric pressure is used.

In general, the temperatures to be used in the process of the present invention vary between about 850° F. and the decomposition temperature of ammonia (about 1250-1300° F.). Preferably, the temperatures vary between about 990° F. and about 1075° F. The preferred temperature to be used in any particular operation will depend upon the nature of the hydrocarbon reactant used and upon the catalyst employed. Generally speaking, the higher temperatures increase the conversion per pass, but they also decrease the ultimate yields of nitriles by increasing the decomposition of the reactants. Accordingly, the criteria for determining the optimum temperature to be used in any particular operation will be based upon the nature of the hydrocarbon reactant, the type of catalyst employed, and a consideration of commercial feasibility from the standpoint of striking a practical balance between conversion per pass and losses to decomposition.

The process of the present invention may be carried out at subatmospheric, atmospheric, or superatmospheric pressures. Superatmospheric pressures are advantageous in that unreacted charge material condense more readily. Subatmospheric pressures appear to favor the reactions involved, since the reaction products have a larger volume than the reactants, and hence, it is evident from the Le Chatelier-Braum principle that the equilibrium favors nitrile formation more at reduced pressures. However, such pressures reduce the throughput of the reactants and present increased difficulties in recycling unreacted charge materials. Therefore, atmospheric or superatmospheric pressures are preferred.

The present process may be carried out by making use of any of the well-known techniques for operating catalytic reactions in the vapor phase effectively. By way of illustration, toluene and ammonia may be vaporized separately in separate preheating zones. The vaporized reactants are then introduced in suitable proportions into a reaction zone containing a catalyst of the type defined hereinbefore. The reaction zone may be a chamber of any suitable type useful in contact catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in the reaction chamber, the catalyst will be thereafter suitably separated from the reaction mixture by filtration, etc. The reaction mixture will be, predominately, a mixture of benzonitrile, hydrogen, unchanged toluene, and unchanged ammonia. The benzonitrile and unchanged toluene will be condensed in passing through the condensing zone and will be retained in the receiving chamber. Benzonitrile can be separated from the unchanged toluene by any of the numerous and well-known separation procedures, such as fractional distillation. Similarly, the unchanged ammonia can be separated from the hydrogen and nitrogen by scrubbing the gases with water or acid. The unchanged toluene and ammonia can be recycled to the process, with or without the addition of fresh toluene and ammonia.

It will be apparent that the process may be operated as a batch, or discontinuous process as by using a catalyst-bed type reaction chamber in which the catalytic and regeneration operations alternate. With a series of such reaction chambers, it will be seen that, as the catalytic operation is taking place in one or more of the reaction chambers, regeneration of the catalyst will be taking place in one or more of the other reaction chambers. Correspondingly, the process may be continuous when one or more catalyst chambers are used through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycled—will flow continuously through a reaction chamber.

The following specific examples are for the purpose of illustrating the mode of preparing catalysts in accordance with the present invention, and for the purpose of demonstrating the advantages thereof. It is to be clearly understood that the invention is not to be limited to the specific catalysts or to the hydrocarbon reactants disclosed hereinafter, or to the conditions and manipulations set forth in the examples. As will be apparent to those skilled in the art, a wide variety of nitriles may be prepared with numerous other promoted catalysts in accordance with the present invention, and by a suitable modification of the hydrocarbon reactant, as set forth hereinbefore.

EXAMPLES I TO XIX

Catalyst preparation

As indicated in Tables I, II, and III, the catalysts to be promoted comprise ten per cent molybdenum oxide supported by a variety of catalyst supports. Some of the catalysts, as set forth in Tables I and II, were obtained from a commercial source (Harshaw Chemical Co.), while the others were prepared in the following manner:

A solution containing 10 parts by weight of molybdenum oxide as ammonium molybdate in about 50 parts by weight of water was prepared and 90 parts by weight of the comminuted selected carrier was suspended therein to form a thick slurry. The resultant mixture was heated at about 250° F. to remove substantially all of the water and the dried residue was heated in a muffle furnace at about 1000° F. for about 16 hours to complete the drying and to convert the molybdenum salt to molybdenum oxide.

The promoted catalysts were prepared from the commercial catalysts and the catalysts prepared as set forth hereinbefore by the following procedure:

To an aqueous solution containing an amount of a decomposable salt sufficient to afford the desired amount of metal oxide promoter, as set forth in Tables I, II, and III, was added an appropriate amount of supported catalytic metal oxide. The mixture was evaporated to substantial dryness, and the solid mass was heated in a muffle furnace at a temperature of about 1000° F. for about 16 hours to convert the salt of the promoter metal to the corresponding oxide.

Catalyst Evaluation

Each catalyst was evaluated by making a run using the promoted catalyst and another run under identical conditions using an unpromoted catalyst identical in every other respect to the promoted catalyst, and comparing the conversions per pass to nitriles (benzonitrile in the case of toluene and acetonitrile in the case of propylene) in per cent by weight based on the hydrocarbon reactant in each pair of runs. A reactor consisting of a shell containing a catalyst chamber heated by circulating a heat-transfer medium thereover, and containing 100 parts by weight of the catalyst being evaluated, was used in each of the runs. Ammonia and hydrocarbon reactant were preheated separately, and introduced into the reactor in a ratio of two moles of ammonia to one mole of hydrocarbon, in the vapor phase, at a rate corresponding to a liquid space velocity of about one in the case of toluene, and a contact time of 5 seconds in the case of propylene. The reaction mixture was passed from the reactor, through a condenser, into a receiving chamber. Unchanged ammonia was separated from hydrogen and nitrogen by continuous scrubbing with acid during the run, and the nitrogen and hydrogen were collected in a gas holder. Where toluene was used as the hydrocarbon reactant, the benzonitrile and unchanged toluene remained in the receiving chamber and, subsequently, were separated by distillation. The pertinent data for these runs are tabulated in Tables I, II, and III:

moter is present in amounts varying between about 0.5 per cent and about 5 per cent, by weight.

Although the present invention has been de-

TABLE I

[Catalyst: 10% molybdena on activated alumina.]

| Example | Hydrocarbon Reactant | Promoter | | | Temperature, °F. | Conversion Per Pass, Per Cent | Improvement, Per Cent | Catalyst [1] |
| --- | --- | --- | --- | --- | --- | --- | --- | --- |
| | | Metal Oxide | Group of Periodic Table | Amount, Per Cent by Weight | | | | |
| I | Toluene | CuO | IB | 1–2 | 985 | 10.4 | 12 | C |
| | | | | | 985 | 9.3 | | C |
| II | do | CuO | IB | 5 | 1,025 | 10.0 | 31 | D |
| | | | | | 1,025 | 7.6 | | D |
| III | do | ThO₂ | IVA | 1–2 | 975 | 9.9 | 13 | C |
| | | | | | 975 | 8.8 | | C |
| IV | do | SiO₂ | IVB | 1–2 | 960 | 10.0 | 14 | C |
| | | | | | 960 | 8.8 | | C |
| V | do | WO₃ | VIA | 1–2 | 980 | 11.3 | 28 | C |
| | | | | | 980 | 8.8 | | C |
| VI | do | WO₃ | VIA | 5 | 975 | 9.8 | 17 | D |
| | | | | | 975 | 8.4 | | D |
| VII | do | WO₃ | VIA | 5 | 1,025 | 11.0 | 45 | D |
| | | | | | 1,025 | 7.6 | | D |
| VIII | do | Ce₂O₃ | IVA | 2 | 920 | 8.7 | 13 | D |
| | | | | | 920 | 7.7 | | D |
| IX | Propylene | WO₃ | VIA | 1–2 | 950 | 9.0 | 82 | C |
| | | | | | 950 | 5.5 | | C |

[1] C = Catalyst obtained from a commercial source. D = Activated alumina impregnated with 10% molybdena.

TABLE II

[Catalyst: Commercial 10% molybdena on alumina gel. Hydrocarbon reactant: Toluene.]

| Example | Promoter | | | Temperature, °F. | Conversion Per Pass Percent | Improvement, Percent |
| --- | --- | --- | --- | --- | --- | --- |
| | Metal Oxide | Group of Periodic Table | Amount, Percent by Weight | | | |
| X | AgO | IB | 2 | 975 | 8.4 | 9 |
| | | | | 975 | 7.7 | |
| XI | BeO | IIA | 2 | 975 | 8.7 | 13 |
| | | | | 975 | 7.7 | |
| XII | BeO | IIA | 2 | 1,025 | 9.4 | 22 |
| | | | | 1,025 | 7.7 | |
| XIII | MgO | IIA | 2 | 975 | 8.7 | 13 |
| | | | | 975 | 7.7 | |
| XIV | PbO | IVB | 2 | 1,025 | 8.7 | 13 |
| | | | | 1,025 | 7.7 | |
| XV | SiO₂ | IVA | 5 | 975 | 9.1 | 18 |
| | | | | 975 | 7.7 | |
| XVI | MnO | VIIA | 2 | 925 | 8.4 | 9 |
| | | | | 925 | 7.7 | |

TABLE III

[Catalyst: 10% molybdena on miscellaneous supports. Hydrocarbon reactant: Toluene.]

| Example | Promoter | | | Catalyst Support | Temperature, °F. | Conversion Per Pass, Per Cent | Improvement, Per Cent |
| --- | --- | --- | --- | --- | --- | --- | --- |
| | Metal Oxide | Group of Periodic Table | Amount, Per Cent by weight | | | | |
| XVII | MgO | IIA | 20 | SiO₂ | 975 | 2.9 | 100 |
| | | | | SiO₂ | 975 | 1.4 | |
| XVIII | SiO₂ | IVB | 5 | MgO | 975 | 5.1 | 31 |
| | | | | MgO | 975 | 3.9 | |
| XIX | Ce₂O₃ | IVA | 0.5 | SiO₂·Al₂O₃ | 975 | 2.5 | 79 |
| | | | | SiO₂·Al₂O₃ | 975 | 1.4 | |

It will be apparent that improvements in conversions per pass as high as 100 per cent are obtained when the promoted catalysts of the present invention are used. Some catalysts show more improvement than others. In the case of catalysts comprising ten per cent molybdenum oxide on the preferred supports, namely, activated alumina and alumina gel, improvements in conversions per pass up to 45 per cent are attained when the catalysts are promoted with oxides of tungsten, copper, beryllium, or silicon. It is to be noted that, although good results are obtained with catalysts comprising as much as 20 per cent by weight of the metal oxide promoter, beneficial results are obtained when the metal oxide promoter is present in amounts varying between about 0.5 per cent and about 5 per cent, by weight.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. In the process for the production of nitriles containing at least two carbon atoms per molecule, which includes contacting a hydrocarbon selected from the group consisting of aromatic hydrocarbons containing at least seven and up to twelve, inclusive, carbon atoms per molecule and having at least one nuclear hydrogen replaced by a univalent, aliphatic, non-acetylenic hydrocarbon radical, and non-acetylenic aliphatic hydrocarbons containing at least two and up to about ten carbon atoms per molecule, with ammonia, in the gaseous phase, at temperatures falling within the range varying between about 850° F. and about 1250° F., and in the presence of a catalyst comprising a molybdenum oxide; the improvement which comprises contacting said hydrocarbon with ammonia in the presence of said catalyst containing additionally an oxide of a metal selected from the group consisting of copper, silver, gold, beryllium, magnesium, zinc, cadmium, thorium, mercury, silicon, titanium, germanium, zirconium, tin, hafnium, uranium, lead, tungsten, manganese, and cerium.

2. In the process for the production of nitriles containing at least two carbon atoms per molecule which includes contacting a hydrocarbon selected from the group consisting of aromatic hydrocarbons containing at least seven and up to twelve, inclusive, carbon atoms per molecule and having at least one nuclear hydrogen replaced by a univalent, aliphatic, nonacetylenic hydrocarbon radical, and non-acetylenic aliphatic hydrocarbons containing at least two and up to about ten carbon atoms per molecule, with ammonia, in the gaseous phase, at temperatures falling within the range varying between about 900° F. and about 1075° F., and in the presence of a catalyst comprising a molybdenum oxide supported on a catalyst support; the improvement which comprises contacting said hydrocarbon with ammonia in the presence of said catalyst containing additionally at least about 0.5 per cent and up to about 20 per cent, based on the weight of the catalyst, of an oxide of copper.

3. In the process for the production of nitriles containing at least two carbon atoms per molecule, which includes contacting a hydrocarbon selected from the group consisting of aromatic hydrocarbons containing at least seven and up to twelve, inclusive, carbon atoms per molecule and having at least one nuclear hydrogen replaced by a univalent, aliphatic, non-acetylenic hydrocarbon radical, and non-acetylenic aliphatic hydrocarbons containing at least two and up to about ten carbon atoms per molecule, with ammonia, in the gaseous phase, at temperatures falling within the range varying between about 850° F. and about 1075° F., and in the presence of a catalyst comprising a molybdenum oxide supported on a catalyst support; the improvement which comprises contacting said hydrocarbon with ammonia in the presence of said catalyst containing additionally at least about 0.5 per cent and up to about 20 per cent, based on the weight of the catalyst, of an oxide of beryllium.

4. In the process for the production of nitriles containing at least two carbon atoms per molecule, which includes contacting a hydrocarbon selected from the group consisting of aromatic hydrocarbons containing at least seven and up to twelve, inclusive, carbon atoms per molecule and having at least one nuclear hydrogen replaced by a univalent, aliphatic, non-acetylenic hydrocarbon radical, and non-acetylenic aliphatic hydrocarbons containing at least two and up to about ten carbon atoms per molecule, with ammonia, in the gaseous phase, at temperatures falling within the range varying between about 900° F. and about 1075° F., and in the presence of a catalyst comprising a molybdenum oxide supported on a catalyst support; the improvement which comprises contacting said hydrocarbon with ammonia in the presence of said catalyst containing additionally at least about 0.5 per cent and up to about 20 per cent, based on the weight of the catalyst, of an oxide of tungsten.

5. In the process for the production of aromatic nitriles, which includes contacting a methyl-substituted aromatic hydrocarbon containing at least seven and up to twelve, inclusive, carbon atoms per molecule, with ammonia, in the gaseous phase, at temperatures falling within the range varying between about 850° F. and about 1250° F., and in the presence of a catalyst comprising a molybdenum oxide supported on a catalyst support; the improvement which comprises contacting said hydrocarbon with ammonia in the presence of said catalyst containing additionally at least about 0.5 per cent and up to about 20 per cent, based on the weight of the catalyst, of an oxide of copper.

6. In the process for the production of aromatic nitriles, which includes contacting a methyl-substituted aromatic hydrocarbon containing at least seven and up to twelve, inclusive, carbon atoms per molecule, with ammonia, in the gaseous phase, at temperatures falling within the range varying between about 850° F. and about 1250° F., and in the presence of a catalyst comprising a molybdenum oxide supported on a catalyst support; the improvement which comprises contacting said hydrocarbon with ammonia in the presence of said catalyst containing additionally at least about 0.5 per cent and up to about 20 per cent, based on the weight of the catalyst, of an oxide of tungsten.

7. In the process for the production of aromatic nitriles of the benzene series, which includes contacting a methyl-substituted benzene with ammonia, in the gaseous phase, at temperatures falling within the range varying between about 900° F. and about 1075° F., and in the presence of molybdenum trioxide supported on alumina; the improvement which comprises contacting said methyl-substituted benzene with ammonia in the presence of said molybdenum trioxide supported on alumina, containing additionally at least about 0.5 per cent and up to about 5 per cent based on the weight of the molybdenum trioxide supported on alumina, of an oxide of copper.

8. In the process for the production of aromatic nitriles of the benzene series, which includes contacting a methyl-substituted benezene with ammonia, in gaseous phase, at temperatures falling within the range varying between about 900° F. and about 1075° F., and in the presence of molybdenum trioxide supported on alumina; the improvement which comprises contacting said methyl-substituted benezene with ammonia in the presence of said molybdenum trioxide supported on alumina, containing additionally at least about 0.5 per cent and up to about 5 per cent, based on the weight of the molybdenum trioxide supported on alumina, of an oxide of tungsten.

9. In the process for the production of benzonitrile, which includes contacting toluene with ammonia, in gaseous phase, at temperatures falling within the range varying between about 900° F. and about 1075° F., and in the presence of molybdenum trioxide supported on alumina; the improvement which comprises contacting said toluene with ammonia in the presence of said molybdenum trioxide supported on alumina, containing additionally at least about 0.5 per cent and up to about 5 per cent, based on the weight of the molybdenum trioxide supported on alumina, of an oxide of copper.

10. In the process for the production of benzonitrile, which includes contacting toluene with ammonia, in gaseous phase, at temperatures falling within the range varying between about 900° F. and about 1075° F., and in the presence of molybdenum trioxide supported on alumina; the improvement which comprises contacting said toluene with ammonia in the presence of said molybdenum trioxide supported on alumina, containing additionally at least about 0.5 per cent and up to about 5 per cent, based on the weight of the molybdenum trioxide supported on alumina, of an oxide of tungsten.

11. In the process for the production of acetonitrile, which includes contacting non-acetylenic $C_3$-aliphatic hydrocarbons with ammonia, in gaseous phase, at temperatures falling within the range varying between about 900° F. and about 1075° F., and in the presence of molybdenum trioxide supported on alumina; the improvement which comprises contacting said hydrocarbons with ammonia in the presence of said molybdenum trioxide supported on alumina, containing additionally at least about 0.5 per cent and up to about 5 per cent, based on the weight of the molybdenum trioxide supported on alumina, of an oxide of tungsten.

WILLIAM I. DENTON.
CHARLES J. PLANK.

REFERENCES CITED

The following references are of record in the file of this patent:

UNITED STATES PATENTS

| Number | Name | Date |
|---|---|---|
| 1,776,875 | Wietzel et al. | Sept. 30, 1930 |
| 2,381,709 | Apgar et al. | Aug. 7, 1945 |
| 2,450,676 | Marisc et al. | Oct. 5, 1948 |
| 2,439,880 | Arnold | Apr. 20, 1948 |

OTHER REFERENCES

Berkman et al., "Catalysis" (Reinhold, 1940), page 869.